US007017373B2

(12) United States Patent
Bauer et al.

(10) Patent No.: US 7,017,373 B2
(45) Date of Patent: Mar. 28, 2006

(54) GLASSWARE FORMING MACHINE CONTROL SYSTEM

(75) Inventors: David J. Bauer, Perrysburg, OH (US);
Thomas G. Green, Sylvania, OH (US);
D. Wayne Leidy, Perrysburg, OH (US);
Matthew D. Redd, Maumee, OH (US);
Jay E. Werner, Toledo, OH (US);
Michael R. Wildgen, Perrysburg, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 488 days.

(21) Appl. No.: 10/235,126

(22) Filed: Sep. 3, 2002

(65) Prior Publication Data
US 2004/0050101 A1 Mar. 18, 2004

(51) Int. Cl.
C03B 9/40 (2006.01)
(52) U.S. Cl. .............................. 65/158; 65/160; 65/163; 65/164; 65/DIG. 13; 700/158
(58) Field of Classification Search ................ 65/158, 65/159, 160, 163, 164, DIG. 13; 700/9, 700/18, 19, 86, 95, 96, 117, 157, 158
See application file for complete search history.

(56) References Cited

U.S. PATENT DOCUMENTS

| 4,108,623 | A | 8/1978 | Cardenas-Franco |
| 4,124,889 | A | 11/1978 | Kaufman |
| 4,152,134 | A | 5/1979 | Dowling |
| 4,413,319 | A | 11/1983 | Schultz |
| 4,457,772 | A | 7/1984 | Haynes |
| 4,477,882 | A | 10/1984 | Schumacher |
| 4,504,927 | A | 3/1985 | Callan |
| 4,510,565 | A | 4/1985 | Dummermuth |
| 4,529,429 | A | 7/1985 | Wood |
| 4,547,211 | A | 10/1985 | Ananias |

(Continued)

FOREIGN PATENT DOCUMENTS

DE 10139808 A1 8/2001

(Continued)

Primary Examiner—Sean Vincent

(57) ABSTRACT

A glassware forming machine system includes a glassware forming machine having first operating mechanisms for converting gobs of molten glass into articles of glassware, a gob delivery system having second operating mechanisms for delivering gobs of molten glass to the glassware forming machine, a ware handling system having third operating mechanisms for receiving and conveying articles of glassware from the glassware forming machine, and an electronic control system for controlling and coordinating operation of the first, second and third operating mechanisms. The electronic control system includes a machine controller coupled to the first operating mechanisms of the glassware forming machine for controlling and coordinating operation of the first operating mechanisms to produce articles of glassware. A gob delivery controller is coupled to the second operating mechanisms of the gob delivery system for controlling and coordinating operation of the second operating mechanisms to deliver gobs of molten glass to the glassware forming machine. A ware handling controller is coupled to the third operating mechanisms of the ware handling system for controlling and coordinating operation of the third mechanisms to convey articles of glassware from the glassware forming machine. A serial data bus interconnects the machine controller, the gob delivery controller and the ware handling controller for communication with each other to coordinate with each other operation of the first, second and third operating mechanisms.

15 Claims, 6 Drawing Sheets

U.S. PATENT DOCUMENTS

| | | |
|---|---|---|
| 4,636,238 A | 1/1987 | Sidler |
| 4,641,269 A | 2/1987 | Japenga |
| 4,679,148 A | 7/1987 | Wood |
| 4,685,947 A | 8/1987 | Liska |
| 4,705,552 A | 11/1987 | Liska |
| 4,708,727 A | 11/1987 | Cardenas-Franco |
| 4,762,544 A | 8/1988 | Davey |
| 4,825,376 A | 4/1989 | Brinker |
| 4,858,101 A | 8/1989 | Stewart |
| 5,125,499 A | 6/1992 | Saathoff |
| 5,247,450 A | 9/1993 | Clark |
| 5,297,257 A | 3/1994 | Struger |
| 5,345,389 A | 9/1994 | Calvin |
| 5,425,794 A | 6/1995 | Frederick |
| 5,445,662 A | 8/1995 | Peterson |
| 5,475,601 A | 12/1995 | Hwang |
| 5,580,366 A | 12/1996 | Farkas |
| 5,609,659 A | 3/1997 | Peterson |
| 5,609,663 A | 3/1997 | Nguyen |
| 5,624,473 A | 4/1997 | Farkas |
| 5,652,490 A | 7/1997 | Bradshaw |
| 5,666,282 A | 9/1997 | Itami |
| 5,697,995 A | 12/1997 | Leidy |
| 5,779,749 A | 7/1998 | Nafziger |
| 5,812,392 A | 9/1998 | Dutto |
| 5,904,745 A | 5/1999 | Nafziger |
| 6,269,662 B1 | 8/2001 | Pinkerton |
| 6,822,970 B1 * | 11/2004 | Redd et al. ............ 370/446 |
| 2002/0035409 A1 | 3/2002 | Lingua |
| 2002/0052669 A1 | 5/2002 | Nittardi |

FOREIGN PATENT DOCUMENTS

| | | |
|---|---|---|
| DE | 10139809 A1 | 8/2001 |
| EP | 0088914 | 9/1983 |
| EP | 0640905 | 3/1995 |
| EP | 1122218 A2 | 8/2001 |
| EP | 1184754 A2 | 3/2002 |
| EP | 1184754 A3 | 11/2002 |
| JP | 4187526 | 7/1992 |
| JP | 4254423 | 9/1992 |
| JP | 5345623 | 12/1993 |
| JP | 7311297 | 11/1995 |
| JP | 08337425 | 12/1996 |
| WO | WO 03016227 | 2/2003 |

* cited by examiner

GLASSWARE FORMING MACHINE CONTROL SYSTEM

The present invention is directed to glassware forming machine systems, and more particularly to an integrated and networked electronic control for a glassware forming machine system.

BACKGROUND AND OBJECTS OF THE INVENTION

The science of glass container manufacture is currently served by the so-called individual section or IS machine. Such machines include a plurality of separate or individual manufacturing sections, each of which has a multiplicity of operating mechanisms for converting one or more charges or gobs of molten glass into hollow glass containers and transferring the containers through successive stages of the machine section. In general, an IS machine system includes a source of glass with a control tube and a needle mechanism for generating one or more streams of molten glass, a shear mechanism for cutting the molten glass into individual gobs, and a gob distributor for distributing the individual gobs among the individual machine sections. Each machine section includes one or more blank molds in which a glass gob is initially formed in a blowing or pressing operation, one or more invert arms for transferring the blanks to blow molds in which the containers are blown to final form, a take-out mechanism for removing the formed containers onto a deadplate, and a sweepout mechanism for transferring molded containers from the deadplate onto a machine conveyor. The conveyor receives containers from all sections of the IS machine and conveys the containers to a loader for transfer to an annealing lehr. Operating mechanisms in each section also provide for closure of mold halves, movement of baffles and blow nozzles, control of cooling wind, etc. U.S. Pat. No. 4,362,544 includes a background discussion of the art of both "blow and blow" and "press and blow" glassware forming processes, and discusses an electropneumatic individual section machine adapted for use in either process.

The operating mechanisms of each machine section were initially operated by pneumatic valves carried by a valve block and responsive to cams mounted on a timing shaft coupled to the machine. Synchronism among the mechanisms within each section, and among the various sections of the machine, was therefore controlled by the timing shaft and the valve drive cams. U.S. Pat. No. 4,152,134 discloses a control arrangement in which a machine supervisory computer (MSC) is connected to a plurality of individual section computers (ISCs), each associated with a corresponding section of the IS machine. Each individual section computer is connected through an associated section operator console (SOC) to solenoid valves in an electropneumatic valve block, which are individually responsive to electronic valve control signals from the section computer and operator console for controlling operation of the associated section operating mechanisms. A timing pulse generator is connected to the machine supervisory computer and to the individual section computers for synchronizing operation within and among the individual sections. The individual section computer and the section operator console illustrated in the noted patent were subsequently combined in a computerized section operator console (COM-SOC, a trademark of applicant's assignee).

U.S. Pat. Nos. 5,580,366 and 5,624,473 disclose an automated glassware manufacturing system in which a forming supervisory computer (FSC) is connected by an ethernet bus to a plurality of computerized section operator consoles (COM-SOCs). Each COM-SOC is connected by a bitbus to an associated intelligent control output module (ICOM). In commercial applications, this connection is by a serial data bitbus. Each ICOM has outputs connected to associated valve blocks for operating pneumatically driven glassware forming mechanisms in the associated machine section. Each COM-SOC and ICOM also receive input from a master timing module for coordinating operation of the various machine sections, and each ICOM unit receives emergency and program stop inputs for terminating machine operation.

It has also been proposed to employ electrically driven operating mechanisms in glass machine systems, particularly in the gob delivery (flow control tube, needles, gob shear and gob distributor) and ware conveyor (machine conveyor, cross-conveyor, radial transfer conveyor and lehr loader) ends of the machine system. It has also been proposed to employ electrically servo-driven operating mechanisms for the invert arm, take-out tongs and sweepout mechanism of each machine section. In glassware machine systems that combine electrically and pneumatically driven operation, the electrical operating mechanisms are driven by stand-alone controllers that receive the same timing signals as are provided to the COM-SOC units to coordinate operation of all mechanisms, but are otherwise not connected to the COM-SOC units or the forming supervisory computer.

In distributed glassware forming machine system control arrangements of the type discussed above, there is generally an excess of computing power and electronic memory over and above what is needed for normal operation of the system. Furthermore, to the extent that operation controllers are stand-alone units, they do not provide information feedback to a forming supervisory computer for desired quality and cost control purposes. It is therefore a general object of the present invention to provide a glassware forming machine control system that is integrated in the sense that the control electronics for all of the system operating mechanisms are interconnected to each other for optimum coordination and control purposes, and preferably are also connected to a forming supervisory computer for downloading new or revised control information to the various controllers and uploading operating information, as needed for information, quality or cost control purposes.

SUMMARY OF THE INVENTION

A glassware forming machine system in accordance with exemplary embodiments of the invention includes a glassware forming machine having first operating mechanisms for converting gobs of molten glass into articles of glassware, a gob delivery system having second operating mechanisms for delivering gobs of molten glass to the glassware forming machine, a ware handling system having third operating mechanisms for receiving and conveying articles of glassware from the glassware forming machine, and an electronic control system for controlling and coordinating operation of the first, second and third operating mechanisms. The electronic control system includes a machine controller coupled to the first operating mechanisms of the glassware forming machine for controlling and coordinating operation of the first operating mechanisms to produce articles of glassware. A gob delivery controller is coupled to the second operating mechanisms of the gob delivery system for controlling and coordinating operation of the second operating mechanisms to deliver gobs of molten glass to the glassware forming machine. A ware handling controller is coupled to the third operating mechanisms of the ware handling system for controlling and coordinating operation of the third mechanisms to convey articles of glassware from the glassware forming machine. A serial data bus interconnects the machine controller, the gob delivery controller and the ware handling controller for communication with each other to coordinate with each other operation of the first, second and third operating mechanisms.

In the exemplary preferred embodiments of the invention, the electronic control system further includes a machine server coupled to the serial data bus for transmitting control information to the machine, gob delivery and ware handling controllers, and for monitoring operation of the controllers. The machine server preferably includes facility for downloading control information from an external source, such as a forming system computer, a web terminal or an operator console connected to the machine sever by a second serial data bus. In the exemplary preferred embodiments of the invention, at least some of the operating mechanisms include pneumatic operating mechanisms operated by valves responsive to electronic control signals, and the controller or controllers coupled to such mechanisms provide such electronic control signals. A machine valve controller may be coupled to the serial data bus independently of the other controllers for controlling air supply to the pneumatic operating mechanisms. In the exemplary preferred embodiments of the invention, the first operating mechanisms of the glassware forming machine include both pneumatic operating mechanisms and electrical operating mechanisms. The machine controller includes a valve controller coupled to the pneumatic operating mechanisms and a servo controller coupled to the electrical operating mechanisms. The valve controller and the servo controller are separately coupled to the serial data bus for communication with each other and with other controllers connected to the bus.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
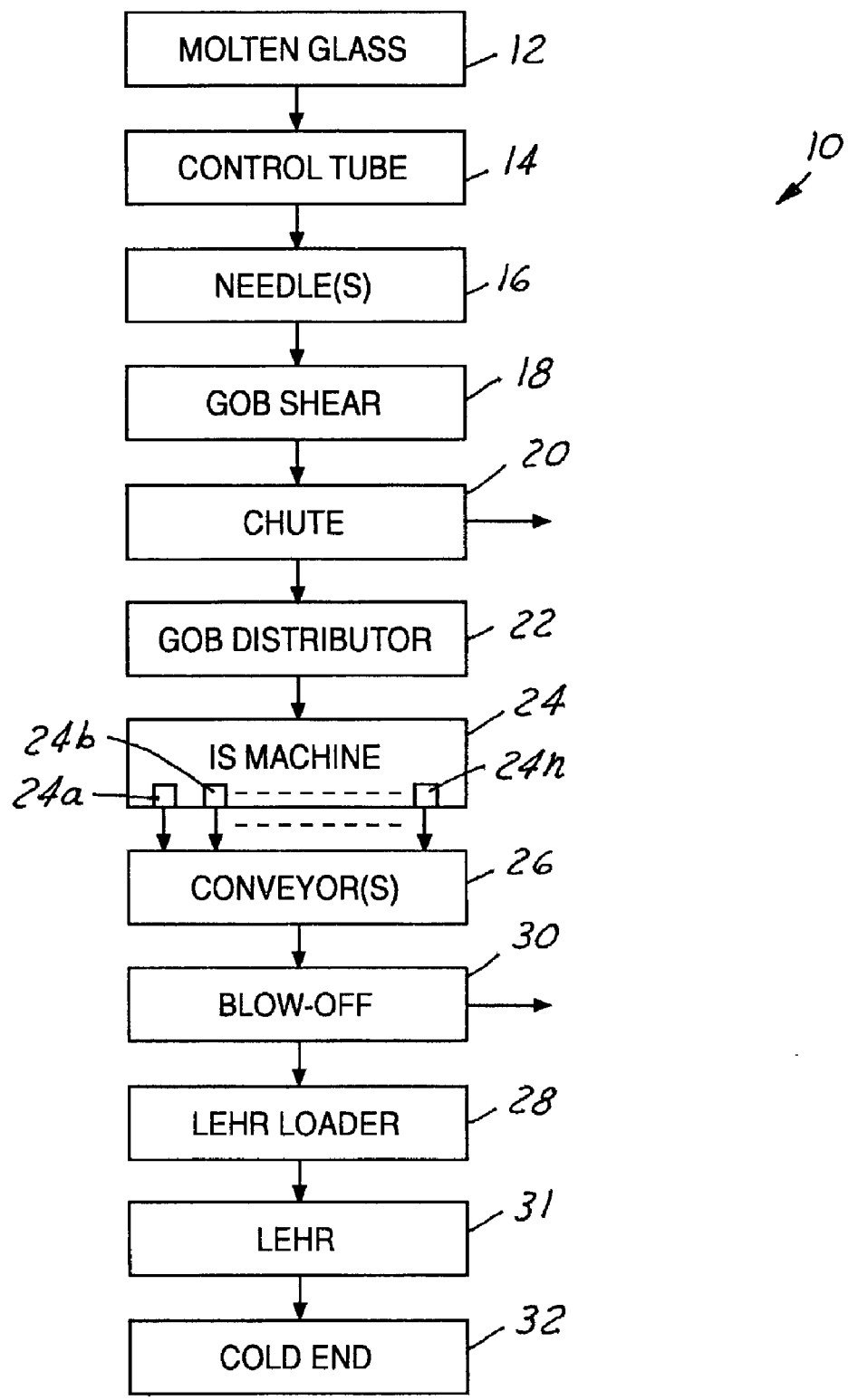
FIG. 1 is a functional block diagram of an individual section glassware forming machine system in accordance with which the present invention preferably is implemented.

FIG. 1 illustrates an IS machine glassware forming system 10 in accordance with a presently preferred implementation of the invention. A reservoir or bowl 12 contains molten glass (form a forehearth). Glass flow from the bowl is controlled by the position of a control tube 14 and the motion of needles 16 to feed one or more streams of molten glass to a gob shear mechanism 18. Shear mechanism 18 severs individual gobs of molten glass, which are fed through a chute 20 and a gob distributor 22 to an IS machine 24. Chute 20 includes facility for controlled redirection of molten glass gobs in the event that one or more sections of IS machine 24 are shut down. IS machine 24 includes a plurality of individual sections, within each of which the gobs are formed into individual articles of glassware. Each section terminates in a sweepout station 24a–24n, from which the articles of glassware are delivered to a series of conveyors 26. Conveyors 26 typically include a machine conveyor for receiving articles of glassware from the various machine sections in sequence, a cross-conveyor for conveying the articles of glassware to a lehr loader 28, and a radial transfer conveyor for transferring the articles of glassware from the machine conveyor to the cross-conveyor. A blow-off station 30 is positioned along the machine conveyor for selectively removing articles of glassware from the conveyor. Lehr loader 28 loads the containers in batches into an annealing lehr 31. The containers are delivered by lehr 31 to the so-called cold end 32 of the manufacturing process, at which the containers are inspected for commercial variations, sorted, labeled, packaged and/or stored for further processing.

System 10 illustrated in FIG. 1 includes a multiplicity of operating mechanisms for performing operations on the glass, moving glass work pieces through sequential steps of the manufacturing operation, and otherwise performing functions in the system. Such operating mechanisms include, for example, control tube 14, needles 16, gob shear 18, gob distributor 22, sweepouts 24a–24n, conveyor(s) 26 and lehr loader 28. In addition, there are a number of operating mechanisms within each section of IS machine 24, such as mechanisms for opening and closing the molds, mechanisms for in and out motion of the funnels, baffles and blowheads, take-out tongs and invert arms. The following table lists some of these mechanisms and corresponding U.S. patents that disclose electronic control of the associated mechanisms:

TABLE 1

| Mechanism(s) | U.S. Pat. Nos. |
| --- | --- |
| Control Tube 14 | 6,289,697 |
| Needle(s) 16 | 5,779,749, 5,885,317 |
| Gob Shear 18 | 5,772,718 |
| Chute 20 | 4,459,146 |
| GOB Distributor 22 | 5,405,424 |
| Conveyor(s) 26 | 6,076,654 |
| Blow-Off 30 | 5,897,677 |
| Lehr Loader 28 | 5,893,449, 5,950,799 |
| Take-Out | 6,241,448, 6,367,287 |
| Invert | 4,548,637 |
| Sweepouts 24a–24n | 4,199,344, 5,160,015 |

All of these U.S. patents, as well as above-noted U.S. Pat. Nos. 4,362,544, 4,152,134, 5,580,366 and 5,624,473, are incorporated herein by reference for purposes of background.

Figure 2:
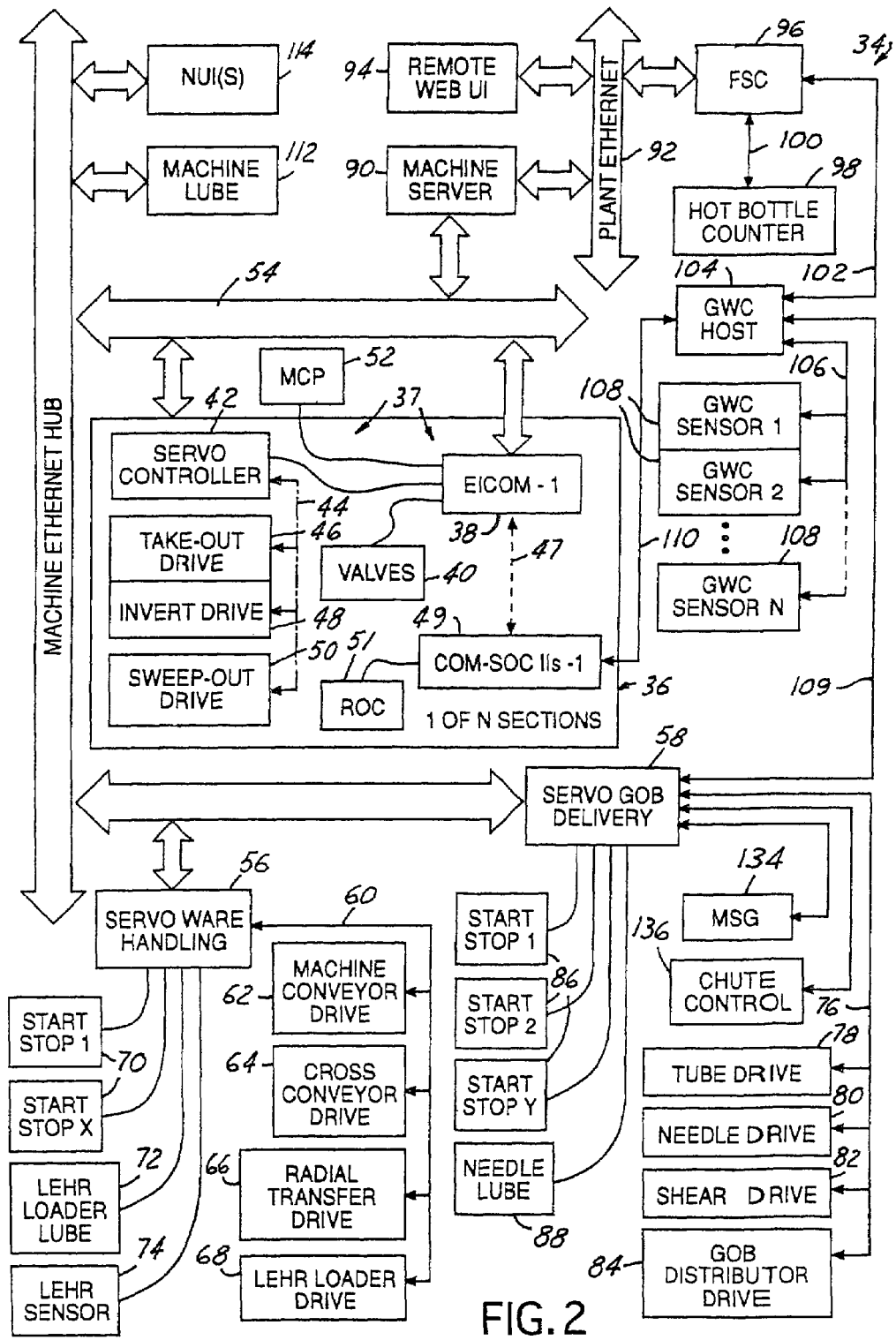
FIG. 2 is a functional block diagram of a glassware forming machine control system in accordance with one presently preferred embodiment of the invention.

FIG. 2 is a functional block diagram of a glassware forming machine control system 34 in accordance with one presently preferred embodiment of the invention. There is a control section 36 (only one being illustrated) for each section of IS machine 24 (FIG. 1). For example, in an eight-section IS machine, there are eight control sections 36, one for each section of the machine. Each control section 36 includes a machine controller 37 coupled to the first operating mechanisms of the glassware forming machine for controlling and coordinating operation of such operating mechanisms to provide articles of glassware. This machine controller in the embodiment of FIG. 1 includes an ethernet-enabled intelligent control output module (EICOM) 38 hardwired to an associated valve block 40 for controlling the valves and thereby applying air to the pneumatic operating mechanisms. The machine controller in the illustrated embodiment of the invention also includes a servo controller 42, which is connected by a serial bus 44 to electrical drive units 46, 48, 50 respectively associated with the take-out, invert and sweepout mechanisms of the associated machine section. Exemplary take-out, invert and sweepout drive systems are illustrated in patents noted above in Table 1. Servo controller 42 is electronically hardwired to EICOM 38. EICOM 38 is connected by a serial bus 47 to an associated COM-SOC unit 49. A remote operator console (ROC) 51 is either permanently or selectively connected to COM-SOC unit 49 for operator variation of control parameters within the COM-SOC unit. EICOM 38 is also connected to a machine control panel (MCP) 52 for monitoring and selective variation of section operating parameters. EICOM 38 controls operation of pneumatic valves 40 for operating the pneumatically driven operating mechanisms of the machine section, while servo controller 42 controls operation of the electrically driven operating mechanisms.

All of the EICOM valve controllers 38 and servo controllers 42 of the N machine sections are individually connected to a machine serial bus 54, such as a machine ethernet bus. Bus 54 is also connected to a servo ware handling controller 56 and a servo gob delivery controller 58. Servo ware handling controller 56 is connected by a serial bus 60 to a machine conveyor drive controller 62, a cross-conveyor drive controller 64, a radial transfer conveyor drive controller 66 and a lehr loader drive controller 68. Servo ware handling controller 56 is also hardwired to a number of start/stop control mechanisms 70, to a lehr loader lubrication controller 72 and to a sensor 74 associated with lehr 30 (FIG. 1). Likewise, servo gob delivery controller 58 is connected by a serial bus 76 to a control tube drive controller 78, a needle drive controller 80, a gob shear drive controller 82 and a gob distributor drive controller 84. Tube drive controller 78 is associated with control tube mechanism 14 (FIG. 1), needle drive controller 80 is associated with needle mechanism 16, shear drive controller 82 is associated with gob shear 18, and gob distributor drive controller 84 is associated with gob distributor 82. In the same way, machine conveyor drive controller 62, cross-conveyor drive controller 64 and radial transfer drive controller 66 are associated with conveyors 26 in FIG. 1, and lehr loader drive controller 68 is associated with lehr loader 28. Servo gob delivery controller 58 is also hardwired to a number of start/stop mechanisms 86, and to a needle lube mechanism 88 for controlling lubrication of needles 16.

The machine controller associated with each machine section, including EICOM valve controller 38 and servo controller 42, servo ware handling controller 56 and servo gob delivery controller 58 (both of which operate for all sections of the IS machine) are interconnected by bus 54 for communication with each other to coordinate with each other operation of the various associated operating mechanisms. All of the controllers are also connected by bus 54 through a machine server 90 to a higher level bus 92, such as an ethernet bus for the entire glass plant. Bus 92 provides for connection of machine server 90 to a connection 94 for coupling to the world wide web or internet to monitor system operation from a remote site, and to a forming supervisory computer (FSC) 96 associated with the entire glass plant. Connection 94 permits machine server 90 to download control information and/or upload production data from and to a remote site. FSC 96 may include facility for scheduling operations, and generating management, production and other reports. In this connection, a hot bottle counter 98 is connected by a suitable serial bus 100 for feeding production information to forming supervisory computer 96. FSC 96 is also connected by a serial bus 102 to a gob weight sensor host computer (GWC) 104, which is connected by a serial bus 106 to a gob weight sensor 108 associated with each machine section 1-N. GWC host computer 104 is also connected to servo gob delivery controller 58 by a serial bus 109, and by a serial bus 110 to the COM-SOC units 48 of the N control sections 36. Machine server 90 is also connected by bus 54 to a machine lube controller 112, and to one or more network user interface stations 114.

Figure 3A:
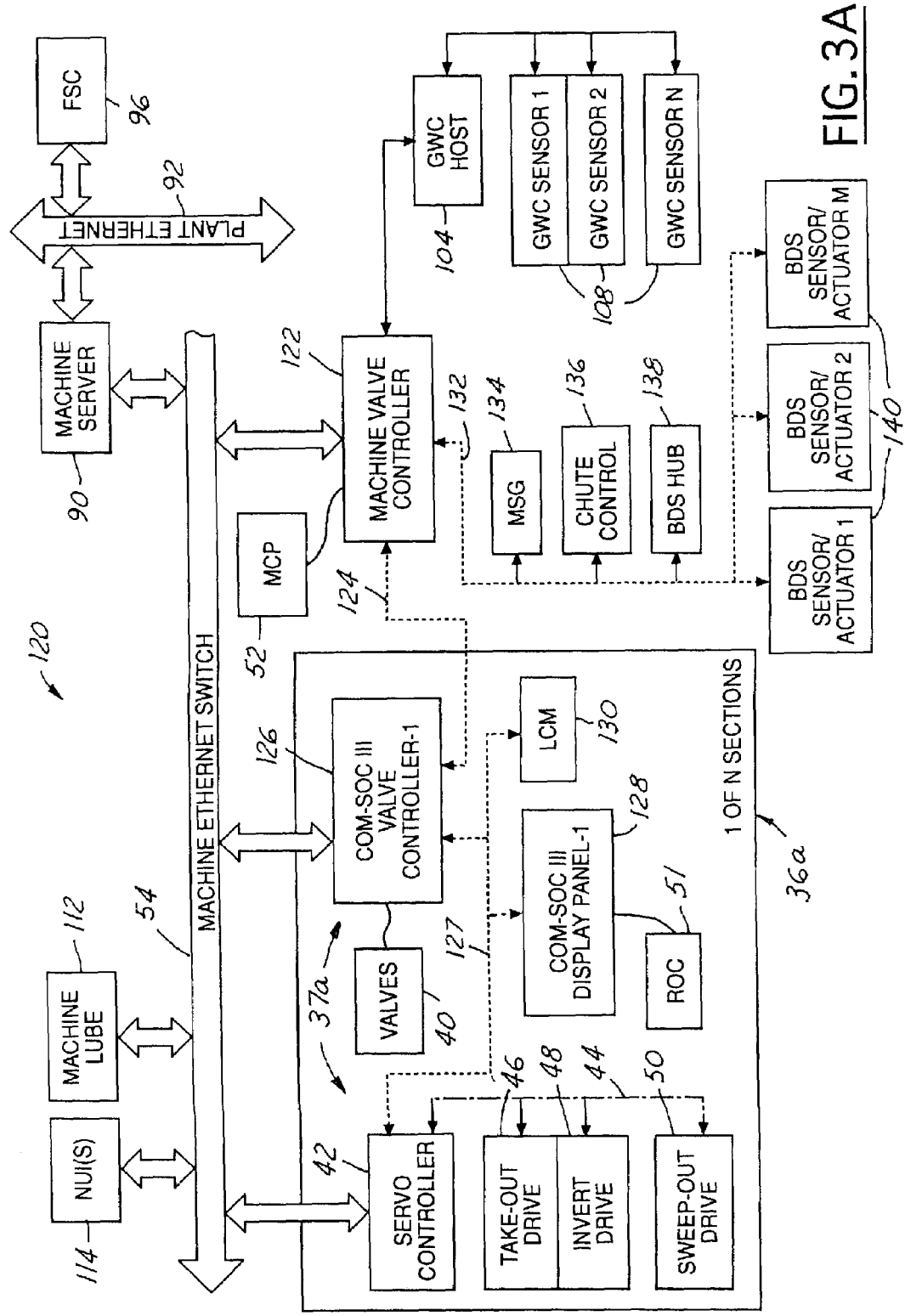
FIGS. 3A and 3B together comprise a functional block diagram of a glassware forming machine control system in accordance with a second preferred embodiment of the invention.
Figure 3B:
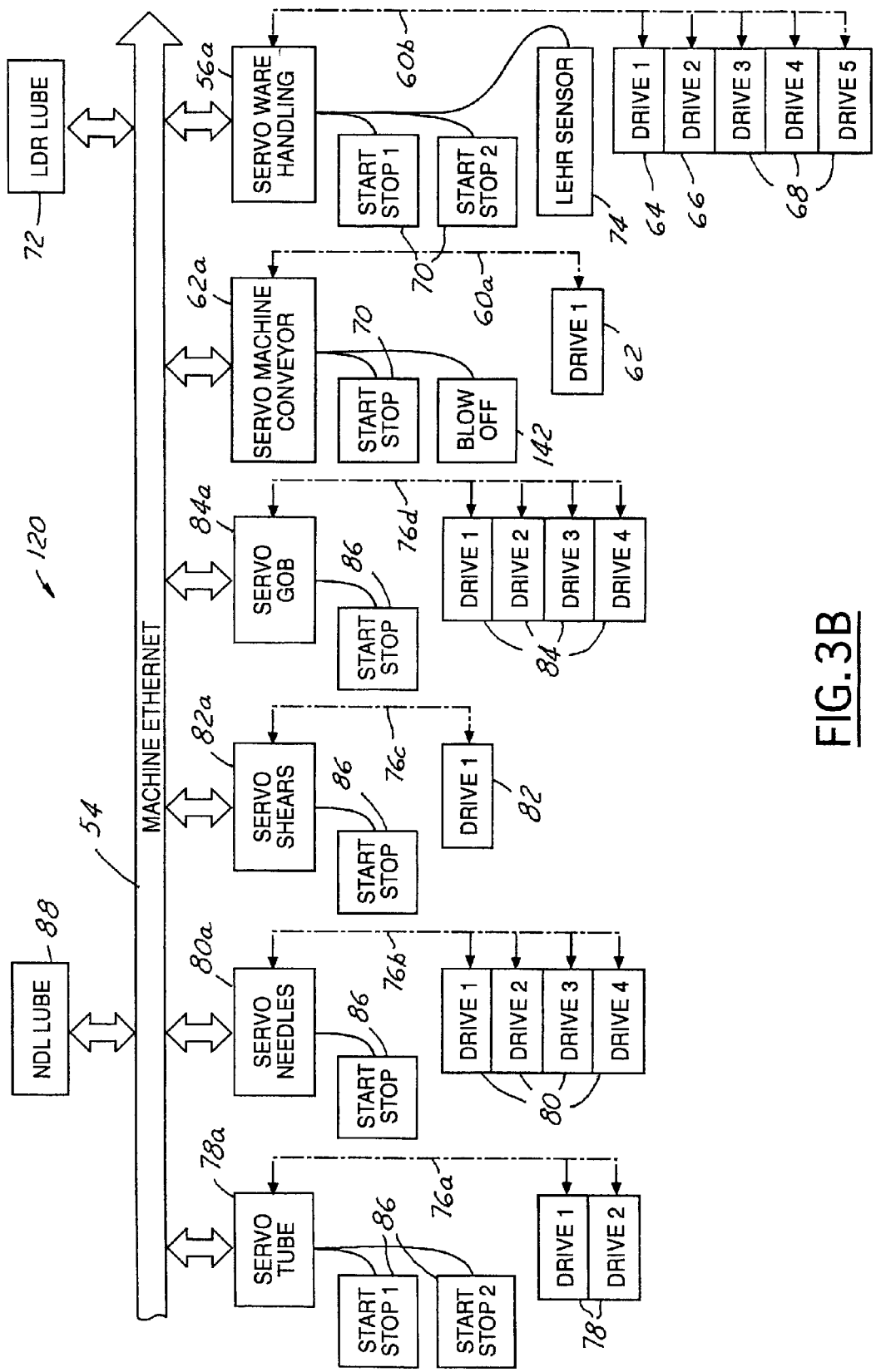

FIGS. 3A and 3B together illustrate a modified glassware forming machine electronic control system 120. Reference numerals in FIGS. 3A and 3B that are identical to those employed in FIGS. 1 and 2 indicate corresponding identical or similar components, while modified components are indicated by the letter suffixes. In system 120 of FIGS. 3A and 3B, there is a machine valve controller 122 (FIG. 3A) coupled to bus 54 for controlling supply of air to pneumatic operating mechanisms that are not associated with any specific machine section. Controller 122 is connected by a serial bus 124 to the COM-SOC valve controller 126 disposed in each machine control section 36a. Within each machine control section 36a, a machine controller 37a includes a servo controller 42 and COM-SOC valve controller 126. COM-SOC valve controller 126 is connected by a serial bus 127 to servo controller 42 as in FIG. 2, to a COM-SOC display panel 128 for providing operator display of section operating parameters and conditions, and to a liquid cooled mold (LCM) controller 130 for controlling cooling of the glassware blank and blow molds in the associated machine section. Liquid mold cooling control is illustrated, for example, in U.S. Pat. No. 6,412,308, the disclosure of which is incorporated herein by reference for purposes of background. Machine valve controller 122 is also connected by a serial bus 132 to a multi sync generator (MSG) 134, to a controller 136 for gob deflector chute 20 (FIG. 1) and to a bottle detection system (BDS) hub computer 138. A plurality of bottle detection system sensors and actuators 140 are also connected to bus 132 for providing bottle detection input to hub computer 138 and receiving actuator control outputs from computer 138. MSG 134 synchronizes operation of the several machine sections.

Referring now to FIG. 3B, another difference between electronic control system 120 and electronic control system 34 (FIG. 2) is that servo gob delivery controller 58 in FIG. 2 is now divided into a servo tube controller 78a, a servo needle controller 80a, a servo shear controller 82a and a servo gob controller 84a. Controllers 78a–84a are each individually connected to serial bus 54 for separate communication with each other and with the other controllers connected to bus 54. Servo tube controller 78a is connected to servo tube drives 78, which are illustrated as separate drives in FIG. 3B for controlling the two axes (rotary and axial) of tube motion. (The separate axes of tube, needle and gob motion are combined in FIG. 2 for simplicity.) Likewise, servo needle controller 80a is connected to separate drives 80 for each needle, typically up to four needles for a so-called quad or four-gob machine system. Servo shear controller 82a is connected to servo shear drive 82, and servo gob controller 84a is connected to drives 84 for each of the gob delivery scoops. Combined servo ware handling controller 56 in FIG. 2 is divided in FIG. 3B into a servo machine conveyor controller 62a coupled to machine conveyor drive 62, and a servo ware handling controller 56a coupled to cross-conveyor drive 64, radial transfer conveyor drive 66 and three drives 68 for the three axes of lehr loader 28 (FIG. 1). Servo machine conveyor controller 62a is also connected to a blow-off controller 142 for controlling operation of blow-off mechanism 30 (FIG. 1) selectively to remove ware from the machine conveyor. Servo tube controller 78a is connected to tube drives 78 by a serial data bus 76a, servo needle controller 80a is connected to needle drives 80 by a serial bus 76b, servo shear controller 82a is connected to servo shear drive 82 by a serial bus 76c, servo gob controller 84a is connected to the four servo gob delivery drives 84 by a serial data bus 76d, servo machine conveyor controller 62a is connected to drive 62 by a serial data bus 60a and servo ware handling controller 56a is connected to drives 64, 66, 68 by a serial data bus 60b.

Data busses 54, 92 in FIGS. 2–3B preferably comprise relatively high-speed busses, such as ethernet busses. The ethernet busses may be connected to the various controllers in a hub configuration as illustrated in the drawings, or through ethernet switches as desired to facilitate communication. Serial data bus 44 within each machine control section 36 or 36a may comprises a medium-speed bus, such as a so-called "firewire" (IEEE 1394) serial data bus. Bus 47 in FIG. 2 preferably is a bitbus. Busses 102, 106, 60 and 76 in FIG. 2 may comprise serial data busses of any suitable configuration and protocol. Busses 76a, 76b, 76c, 76d, 60a and 60b in FIG. 3B may comprise medium-speed serial data busses, such as "firewire" busses. Busses 124, 127 and 132 in FIG. 3A may comprise relatively low-speed busses, such as serial data busses employing so-called CANbus technology.

Figure 4:
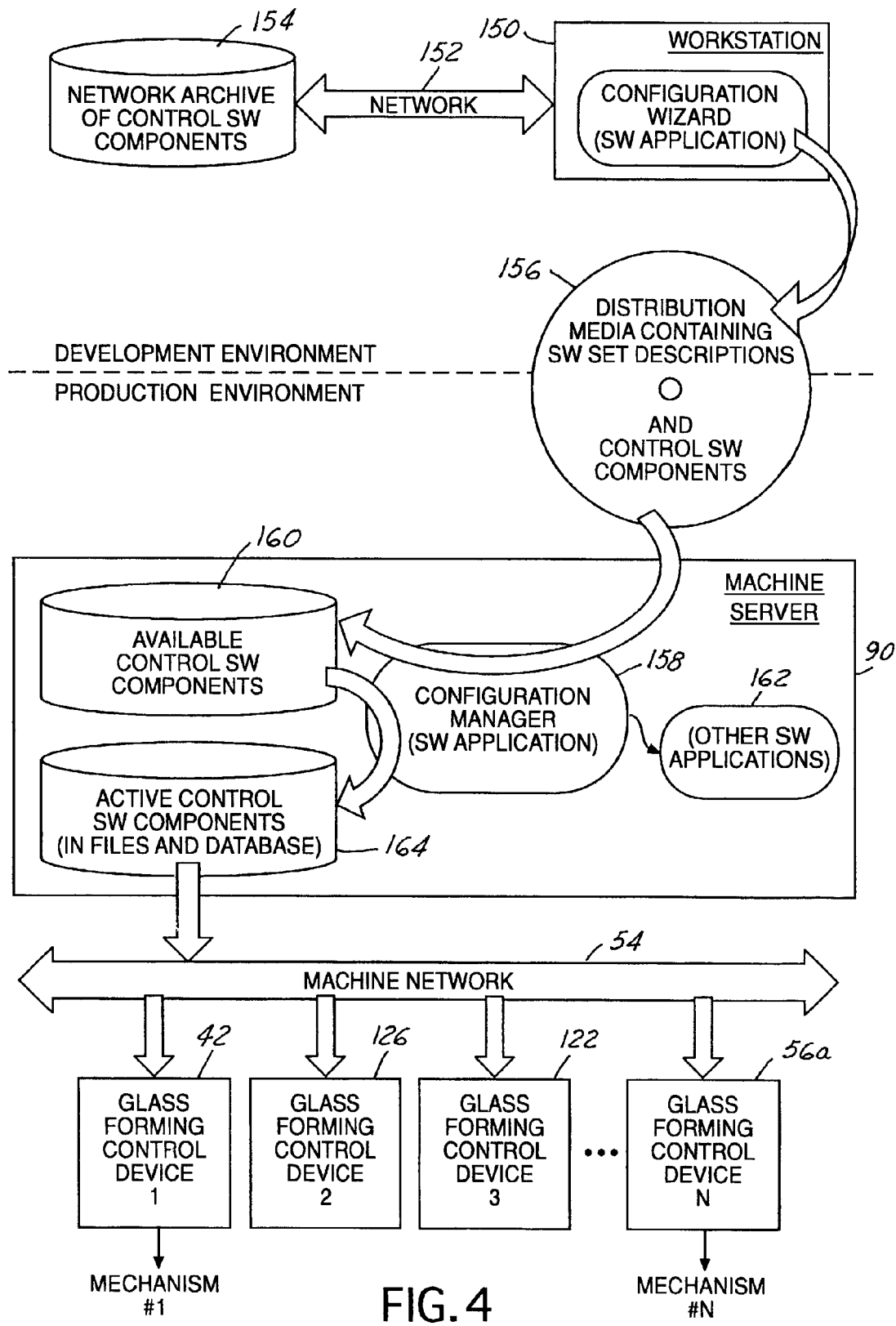
FIG. 4 is a schematic diagram that illustrates implementation of control programming in the system of FIGS. 2 or 3A–3B.

FIG. 4 illustrates one important advantage of the present invention, as illustrated in either FIG. 2 or FIGS. 3A–3B. That is, all control programming for all of the glassware forming system controllers can be entered, downloaded and monitored through a single machine sever 90. The system automatically manages all of the many control program versions of the several controllers in the glass container forming system. This avoids all of the effort and errors of manually updating each control program, and avoids the burden of shutting down the entire forming system when only a few of the control devices require an update. The system also manages the situation where updates to one of the control device programs requires a corresponding update to other device control programs. The system also prevents the situation in which a unique untested combination of control device program versions or revision levels are unintentionally deployed, potentially creating interaction problems. The system also reduces the amount of process downtime required to load and enable new control program updates, and simplifies reversion to previous control programs where needed.

Referring to FIG. 4, a work station 150 is illustrated as being connected by a network 152 to an archive 154 of previously employed control programming. A control program developer may employ suitable configuration wizard programming to compile a set of control programs, which may be stored on a suitable medium 156, such as a CD-ROM or DVD, for loading into machine server 90. As an alternative, operator work station 150 may comprise one of the network user interfaces 114 (FIGS. 2 and 3A) connected to machine server 90 by bus 54, or may be connected to machine server 90 through bus 92, either directly or through the internet. A configuration manager program 158 within machine server 90 loads the new control programming into a memory 160 of available control programs. Configuration manager 158 also has access to a memory 162 of other control programs previously developed. If the new control programming is consistent with the hardware and controllers connected to machine server 90, configuration manager 158 may load the new control programming into a file 164 of active control programming for down-loading to the appropriate controllers by means of bus 54. In addition to providing a central facility for storing, monitoring and down-loading all control programming, the system of the present invention has the advantage of reducing the amount of memory required in the various device controllers. In other words, it is not necessary for servo controller 42, servo ware handling controller 56, servo gob delivery controller 58, etc. in FIGS. 2–3B to have sufficient memory to store a library of control programming inasmuch as the control programming required for immediate operation can be readily and rapidly downloaded from machine server 90. Furthermore, the ability or requirement for substantial operator variation of the control programming at the various controllers can be greatly reduced. A graphic user interface for all devices of the machine system may be provided at a single station. There is complete "top to bottom" communication of programming, parameters and status information, as well as time-critical control information. The invention also offers advantages in improved scalability and price/performance optimization, while having the capability for supporting additional peripheral devices as needed for further development.

Figure 5:
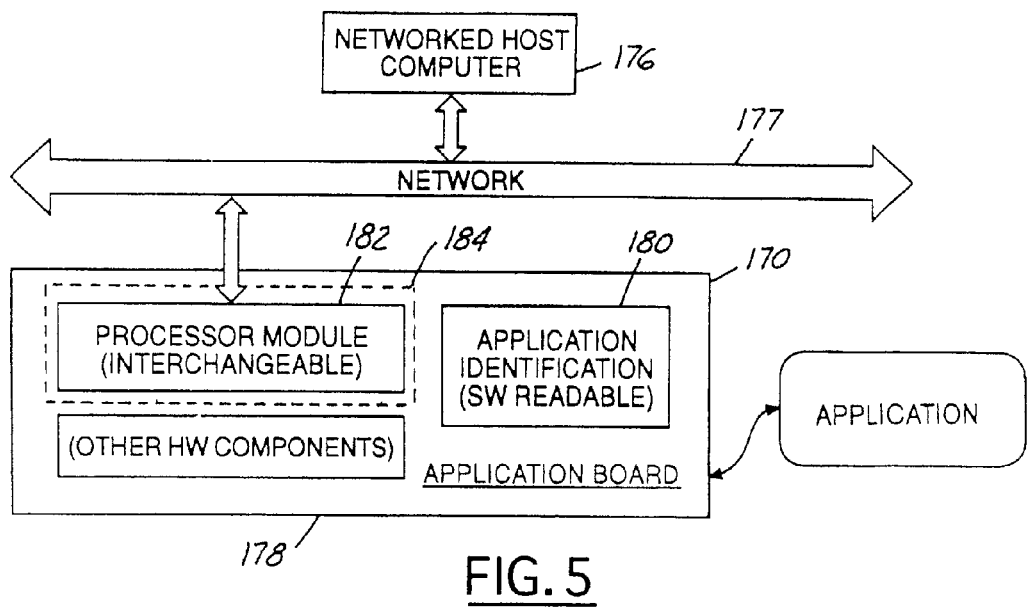
FIGS. 5 and 6 are functional block diagrams of exemplary control boards in the controllers of FIGS. 2 and 3A–3B in accordance with two additional aspects of the invention.
Figure 6:
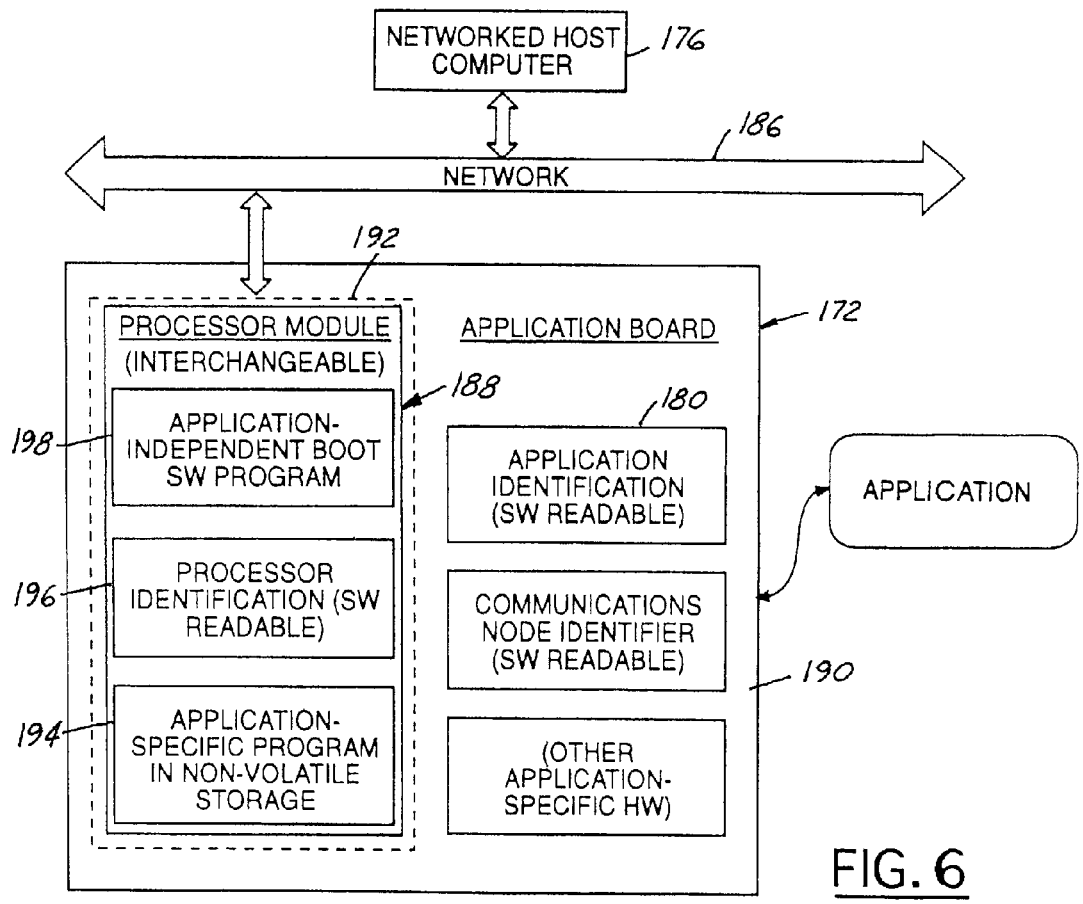

FIGS. 5 and 6 illustrate two controller configurations for the various electronic controllers discussed in connection with FIGS. 1–4. FIG. 5 illustrates a controller configuration 170 without on-board non-volatile storage, while FIG. 6 illustrates a controller configuration 172 with on-board non-volatile storage. Referring to FIG. 5, controller configuration 170 is connected to a host computer 176, such as machine server 90 in FIGS. 2–3A, by means of a bus 177. Controller configuration 170 includes an application motherboard 178 having software (SW) readable application-specific indicia 180, such as a DIP switch. This indicia identifies the application for which the controller is intended, such as a servo ware handling controller 56 (FIG. 2) for example. An interchangeable processor module 182 is removably connected to board 178, such as by means of a socket 184. Processor module 182 includes prestored programming for reading application identification indicia 180, communicating such indicia to host computer 176 through network 177, and then downloading from the host computer control programming needed for operation in connection with the specific operating mechanisms for which controller configuration 170 is to be used. For example, if controller configuration 170 is to be used as a servo ware handling controller 56 in FIG. 2, upon initial application of power or at any other suitable time for resetting control programming, host computer 176 (machine server 90 in this example) may download through network 177 (bus 54 in this example) all of the control programming needed for operation of machine conveyor drive 62, cross-conveyor drive 64, radial transfer drive 66 and lehr loader drive 68. On the other hand, if controller configuration 170 in FIG. 5 is intended for use as a machine valve controller 122 (FIG. 3A), and application identification indicia 180 so indicates, then machine valve controller 122 would obtain the necessary control programming from machine server 90, and download the control programming by means of serial data bus 54 (FIG. 3A). In this instance, network host computer 176 in FIG. 5 would comprise machine server 90 in FIG. 3A, and network 175 would comprise serial bus 54.

Controller configuration 172 in FIG. 6 is particularly useful for controllers connected to the next higher level controller 176 by a relatively slow network connection 186. Controller configuration 172 includes a processor module 188 removably and interchangeably mounted on a motherboard 190, such as by means of as socket 192. Processor module 188 includes application-specific control programming in non-volatile storage 194, and programming 196 for comparison of the programming stored in memory 194 to the application-specific indicia 180 on motherboard 190. Upon initial application of power, application-independent boot software 198 causes processor identification software 196 to compare the application-specific programming in memory 194 with the application-identifying indicia 180 on the motherboard to confirm that processor module 174 is suitable for that specific application. For example, if controller configuration 172 in FIG. 6 is employed as a chute controller 136 in FIG. 3A and the processor module 188 fails, an operator would replace the failed processor module with a new processor module. However, inasmuch as all processor modules would generally appear identical, it is necessary to confirm that the new processor module 188 contains the required programming for use as a chute controller. This is accomplished by comparing the application-specific programming in memory 194 to the application-identifying indicia 180 before initiating operation of the chute control mechanism. If the comparison is satisfactory, then chute control can begin. However, if the comparison is not satisfactory, the operator would be advised to replace the new processor module with one appropriate for chute control, or alternatively to download new control programming from host computer 176 through network 186 (bus 54, machine controller 122 and bus 132 in FIG. 3A) to configure the new processor module as one suitable for chute control.

There has thus been disclosed a glassware forming machine system, and more particularly an electronic control system for controlling operation of glassware forming and transfer mechanisms, that fully satisfies all of the objects and aims previously set forth. The invention has been discussed in conjunction with a number of presently preferred embodiments thereof, and various modifications and variations have also been discussed. Other modifications and variations will readily suggest themselves to persons of ordinary skill in the art. The invention is intended to embrace these and all other modifications and variations as fall within the spirit and broad scope of the appended claims.

The invention claimed is:

1. A glassware forming machine system that includes a glassware forming machine having first operating mechanisms for converting gobs of molten glass into articles of glassware, a gob delivery system having second operating mechanisms for delivering gobs of molten glass to said glassware forming machine, a ware handling system having third operating mechanisms for receiving and conveying articles of glassware from said glassware forming machine, and an electronic control system for controlling and coordinating operation of said first, second and third operating mechanisms, said electronic control system including:

a machine controller coupled to said first operating mechanisms of said glassware forming machine for controlling and coordinating operation of said first operating mechanisms to produce articles of glassware, a gob delivery controller coupled to said second operating mechanisms of said gob delivery system for controlling and coordinating operation of said second operating mechanisms to deliver gobs of molten glass to said glassware forming machine, a ware handling controller coupled to said third operating mechanisms of said ware handling system for controlling and coordinating operation of said third mechanisms to convey articles of glassware from said glassware forming machine, and a machine serial data bus interconnecting said machine controller, said gob delivery controller and said ware handling controller for communication with each other to coordinate with each other operation of said first, second and third operating mechanisms.

2. The system set forth in claim 1 wherein said electronic control system further includes a machine server connected to said machine serial data bus for transmitting control information to said machine, gob delivery and ware handling controllers, and for monitoring operation of said controllers.

3. The system set forth in claim 2 wherein said machine server includes facility for down-loading control information from an external source.

4. The system set forth in claim 3 wherein said machine server includes facility for downloading control information and uploading production data to remote locations through the world wide web.

5. The system set forth in claim 2 wherein said machine server includes a configuration manager that monitors control programs at said controllers to ensure that such control programs are consistent with each other.

6. The system set forth in claim 5 wherein said machine server includes facility for receiving new or revised control programming for one of said controllers, accessing a library of current control programming for other of said controllers, and downloading said new or revised control programming to said one controller when said new or revised programming is consistent with said current programming.

7. The system set forth in claim 1 wherein at least some of said operating mechanisms include pneumatic operating mechanisms operated by valves responsive to electronic control signals, and wherein at least one of said controllers is adapted to provide said electronic control signals to said valves.

8. The system set forth in claim 7 wherein said electronic control system further includes a machine valve controller, coupled to said machine serial data bus independently of said machine, gob delivery and ware handling controllers, for controlling air supply to at least some of said pneumatic operating mechanisms.

9. The system set forth in claim 8 wherein each of said pneumatic operating mechanisms includes an associated valve drive module, and wherein a second serial bus connects said valve drive modules to said machine valve controller.

10. The system set forth in claim 1 wherein said first operating mechanisms of said glassware forming machine include both pneumatic operating mechanisms and electrical operating mechanisms, and wherein said machine controller includes a valve controller coupled to said pneumatic operating mechanisms and a servo controller coupled to said electrical operating mechanisms, said valve controller and said servo controller being separately coupled to said machine serial data bus.

11. The system set forth in claim 10 wherein each of said electrical operating mechanisms includes an associated electrical drive module, and wherein said machine controller further includes a second serial data bus connecting said servo controller to said drive modules.

12. The system set forth in claim 1 wherein said glassware forming machine includes a plurality of machine sections each having said first operating mechanisms, and wherein said electronic control system includes a plurality of said machine controllers each coupled to the first operating mechanisms of an associated machine section and each connected to said machine serial data bus.

13. The system set forth in claim 1 wherein said first operating mechanisms include electrical operating mechanisms selected from the group consisting of take-out, invert and sweep-out mechanisms, said second operating mechanisms include electrical operating mechanisms selected from the group consisting of control tube, needle, shear and gob distribution mechanisms, and wherein said third operating mechanisms include electrical operating mechanisms selected from the group consisting of machine conveyor, cross-conveyor, radial transfer and lehr loader mechanisms.

14. The system set forth in claim 1 wherein at least one of said controllers includes:
   an application motherboard including electronically readable indicia associated with use of said motherboard in combination with one or more specific operating mechanisms, and
   a processor module interchangeably mounted on said motherboard, including application-specific control programming in non-volatile memory for comparison to said readable indicia to determine whether said processor module can be used for controlling said specific operating mechanisms.

15. The system set forth in claim 1 wherein said electronic control system includes a host computer coupled to said machine serial data bus and having stored therein control programming for at least one of said controllers, and
   wherein at least one of said controllers includes:
   an application motherboard including electronically readable indicia associated with use of said motherboard in combination with one or more specific operating mechanisms, and
   a processor module interchangeably mounted on said motherboard, including programming for reading said indicia, communicating said indicia to said host computer, and then downloading from said host computer control programming needed for operating said specific operating mechanisms.

* * * * *